(12) United States Patent
Inoue

(10) Patent No.: US 11,719,970 B2
(45) Date of Patent: Aug. 8, 2023

(54) DISPLAY DEVICE AND METHOD OF MANUFACTURING THE SAME, ELECTRONIC EQUIPMENT AND METHOD OF MANUFACTURING THE SAME, AND BACKLIGHT UNIT

(71) Applicant: Japan Display Inc., Tokyo (JP)

(72) Inventor: Kaoru Inoue, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/579,726

(22) Filed: Jan. 20, 2022

(65) Prior Publication Data

US 2022/0137447 A1 May 5, 2022

Related U.S. Application Data

(63) Continuation of application No. PCT/JP2020/018939, filed on May 12, 2020.

(30) Foreign Application Priority Data

Jul. 22, 2019 (JP) ................................ 2019-134344

(51) Int. Cl.
G02F 1/1333 (2006.01)
G02F 1/1335 (2006.01)
G02F 1/13357 (2006.01)

(52) U.S. Cl.
CPC .... *G02F 1/133317* (2021.01); *G02F 1/13338* (2013.01); *G02F 1/133528* (2013.01); *G02F 1/133602* (2013.01)

(58) Field of Classification Search
None
See application file for complete search history.

(56) References Cited

U.S. PATENT DOCUMENTS

| 2012/0105400 | A1  | 5/2012  | Mathew et al. |
| 2013/0177302 | A1  | 7/2013  | Weber |
| 2016/0161664 | A1* | 6/2016  | Ishida ............... G02B 6/0045 359/230 |
| 2017/0187934 | A1  | 6/2017  | Kwak et al. |

FOREIGN PATENT DOCUMENTS

| CN | 108957855 A | * | 12/2018 | ....... G02F 1/133605 |
| CN | 109116621 A | * | 1/2019  | ....... G02F 1/133512 |
| CN | 109799643 A |   | 5/2019  | |
| CN | 209028373 U |   | 6/2019  | |

(Continued)

OTHER PUBLICATIONS

International Search Report dated Jun. 16, 2020 in PCT/JP2020/018939 filed on May 12, 2020, 2 pages.

(Continued)

*Primary Examiner* — Phu Vu
(74) *Attorney, Agent, or Firm* — Maier & Maier, PLLC

(57) ABSTRACT

A display device capable of suppressing light leakage is provided. The display device includes a panel, a transparent region provided in a display region of the panel, a frame region provided between the transparent region and the display region, a backlight unit, and a bezel. In the frame region, the panel, the backlight unit, and the bezel are adhered by a tape, and the bezel and the tape have a function of blocking visible light.

13 Claims, 13 Drawing Sheets

(56) References Cited

FOREIGN PATENT DOCUMENTS

| | | |
|---|---|---|
| JP | 2012-098726 A | 5/2012 |
| JP | 2017-142497 A | 8/2017 |
| KR | 10-2018-0043493 A | 4/2018 |
| WO | 2015/022887 A1 | 2/2015 |
| WO | WO 2015/022887 A1 | 2/2015 |

OTHER PUBLICATIONS

Office Action dated May 30, 2023, in corresponding Japanese Application No. 2019134344, 8 pages.

* cited by examiner

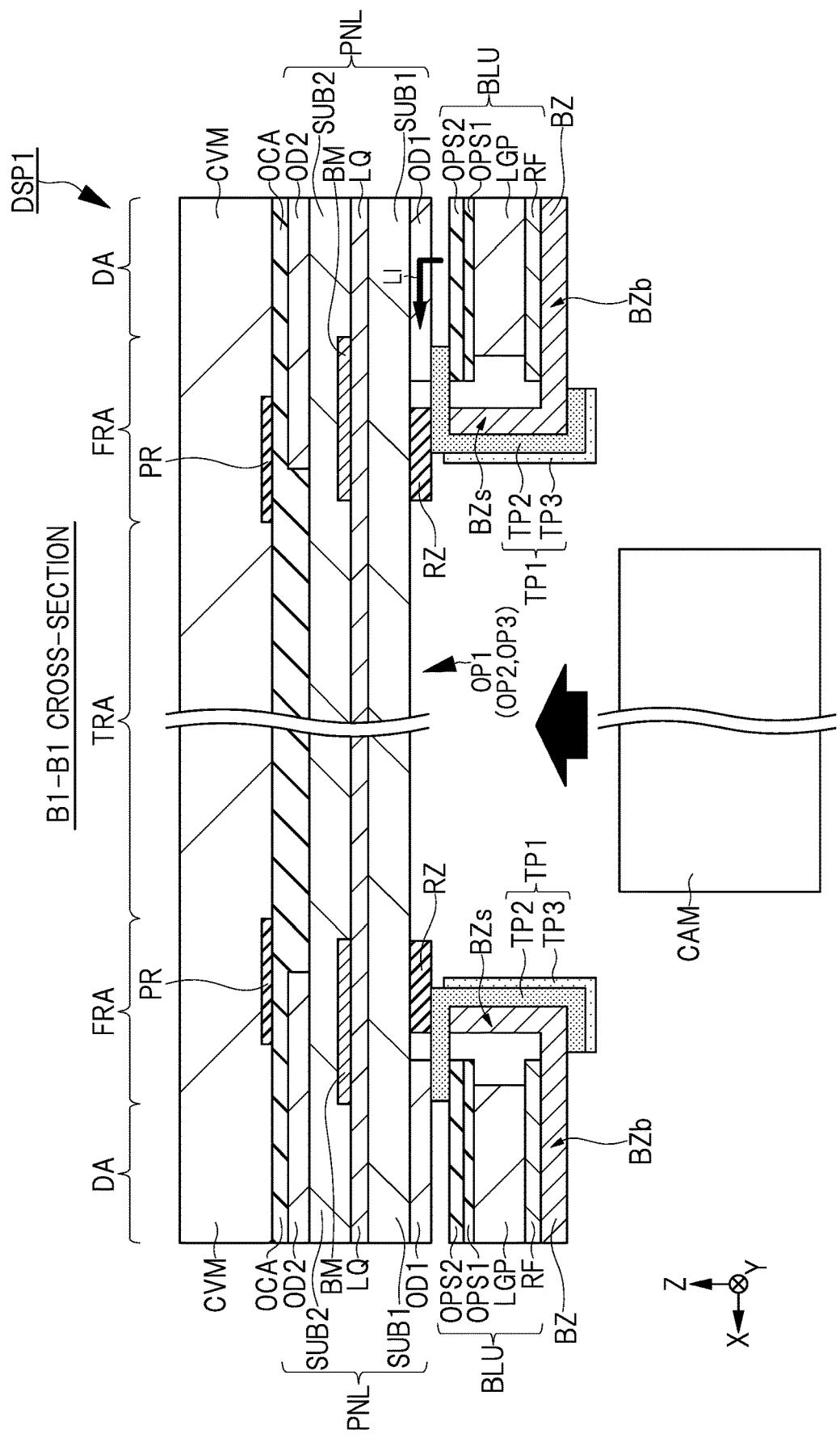

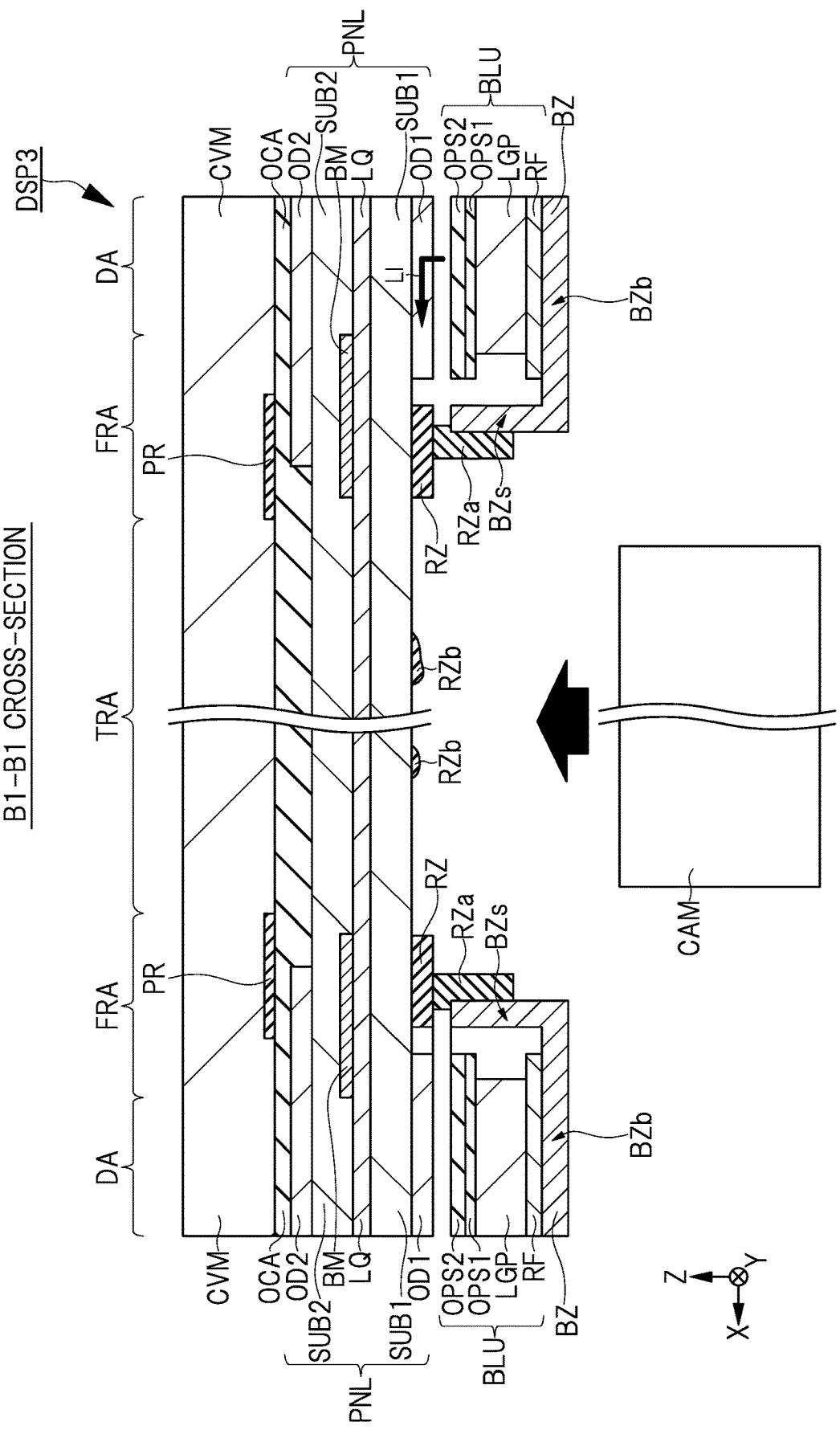

C-C CROSS-SECTION

C-C CROSS-SECTION

C-C CROSS-SECTION

C-C CROSS-SECTION

C-C CROSS-SECTION

C-C CROSS-SECTION

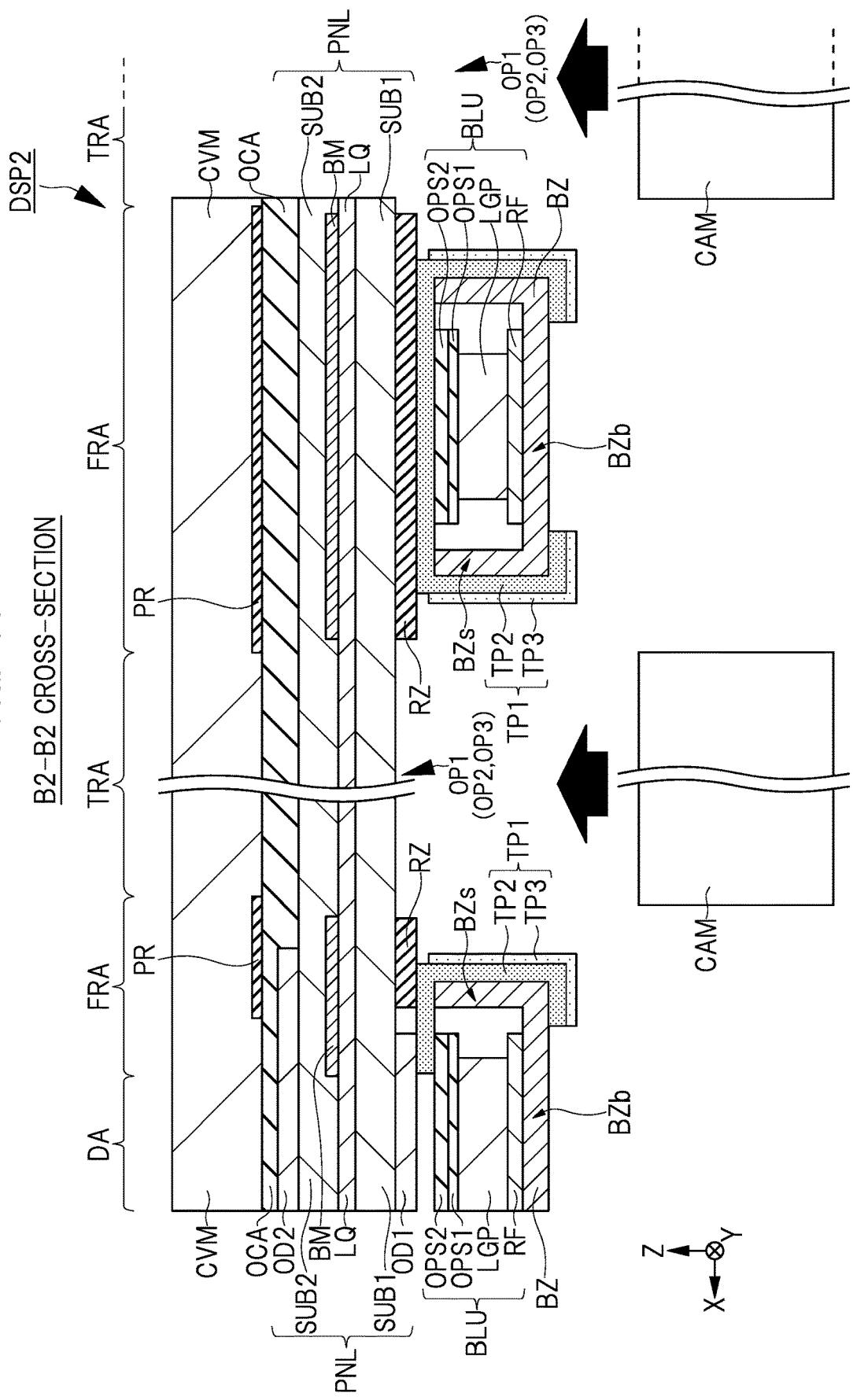

DISPLAY DEVICE AND METHOD OF MANUFACTURING THE SAME, ELECTRONIC EQUIPMENT AND METHOD OF MANUFACTURING THE SAME, AND BACKLIGHT UNIT

CROSS REFERENCE TO RELATED APPLICATIONS

The present application is a continuation of International Application No. PCT/JP2020/018939 filed on May 12, 2020, and claims priority to Japanese Patent Application No. 2019-134344 filed on Jul. 22, 2019, the disclosure of which is incorporated herein by reference.

TECHNICAL FIELD OF THE INVENTION

The present invention relates to a display device and particularly relates to a display device having a transparent region which does not overlap with pixels in a display region and a method of manufacturing the same, an electronic equipment using the display device and a method of manufacturing the same, and a backlight unit mounted in the display device.

BACKGROUND OF THE INVENTION

In recent years, in an electronic equipment using a display device having a panel provided with a liquid crystal layer or the like, an electronic component such as a camera module or a sensor module is mounted in the electronic equipment.

Patent Document 1 discloses a technique of forming a hole for a camera in glass serving as a cover member and forming an optical barrier peripheral portion made of a metal thin film on an inner wall of the hole.

Patent Document 2 discloses a technique of forming a hole in a first substrate which is a transistor layer and a second substrate which is a color filter layer, making a part of the transistor layer protrude toward the hole side, and forming a transparent insert layer between the protruding portion and a cover member.

Patent Document 3 discloses a technique of forming a metal pattern of the same layer as a gate electrode in the vicinity of a hole in which a camera module is mounted.

RELATED ART DOCUMENTS

Patent Documents

Patent Document 1: Japanese Unexamined Patent Application Publication No. 2017-142497
Patent Document 2: Japanese Unexamined Patent Application Publication No. 2012-98726
Patent Document 3: US Patent Application Publication No. 2017/0187934

SUMMARY OF THE INVENTION

Problem to be Solved by Invention

For example, when a display device is provided with a camera module, the camera module is provided at a position surrounded by a backlight unit provided below the panel. In other words, the camera module is provided inside an opening formed in the backlight unit. Therefore, there is a problem that the characteristics of the camera are deteriorated due to the leakage of the light emitted from the backlight unit toward the camera module side. Accordingly, a technique for developing a display device capable of suppressing the light leakage described above, thereby improving the performance of the electronic equipment in which the display device is used is desired.

The other problems and novel features will be apparent from the description of this specification and accompanying drawings.

Means for Solving the Problem

A display device according to an embodiment includes a backlight unit having an opening, a bezel having a bottom portion covering a lower side of the backlight unit and a side portion covering the opening in an inside of the opening, and a panel having a display region, a first region overlapping with the opening inside the display region, and a second region provided between the display region and the first region. Here, the panel, the backlight unit, and the bezel are adhered by a first tape having a light-blocking property at a position overlapping with the second region, and the first tape is adhered to the side portion of the bezel.

A method of manufacturing a display device according to an embodiment includes (a) a step of preparing a first tape in which a second tape which is a double-sided tape and a third tape are bonded together, (b) a step of processing an outer diameter of the third tape so that a part of the second tape is exposed, and (c) a step of processing an outer diameter of the second tape and forming a slit penetrating through the second tape and the third tape. Also, the method of manufacturing the display device includes (d) a step of preparing a panel including a first substrate, a second substrate provided above the first substrate, and an electro-optical layer formed between the first substrate and the second substrate, (e) a step of preparing a backlight unit, and (f) a step of preparing a bezel having a bottom portion and a side portion bent from the bottom portion. In addition, the method of manufacturing the display device includes (g) after the steps (a) to (f), a step of mounting the backlight unit on the bottom portion of the bezel such that a side of the backlight unit is covered with the side portion of the bezel, and (h) after the step (g), a step of attaching a portion of the second tape exposed from the third tape to a tip of the side portion of the bezel and an upper surface of the backlight unit. Further, the method of manufacturing the display device includes (i) after the step (h), a step of attaching a portion of the second tape covered with the third tape to the side portion of the bezel, and (j) after the step (i), a step of attaching the portion of the second tape exposed from the third tape to the panel. Here, the panel has a transparent region provided inside a display region of the panel in a plan view and a frame region provided between the transparent region and the display region in a plan view, and the backlight unit and the bezel are provided below the first substrate so as not to overlap with the transparent region in a plan view. Also, the second tape and the third tape are provided in the frame region, and the second tape and the bezel have a function of blocking visible light.

A backlight unit according to an embodiment includes a light guide layer having an opening, a bezel having a bottom portion and a side portion covering the opening in an inside of the opening, and a first tape adhered to the bottom portion and the side portion.

BRIEF DESCRIPTIONS OF THE DRAWINGS

FIG. 6 is a cross-sectional view showing a peripheral structure of a transparent region according to the first embodiment;

FIG. 7 is a cross-sectional view showing a peripheral structure of a transparent region according to a studied example;

FIG. 16 is a cross-sectional view showing a peripheral structure of a transparent region according to the second embodiment.

DESCRIPTIONS OF THE PREFERRED EMBODIMENTS

Figure 1:
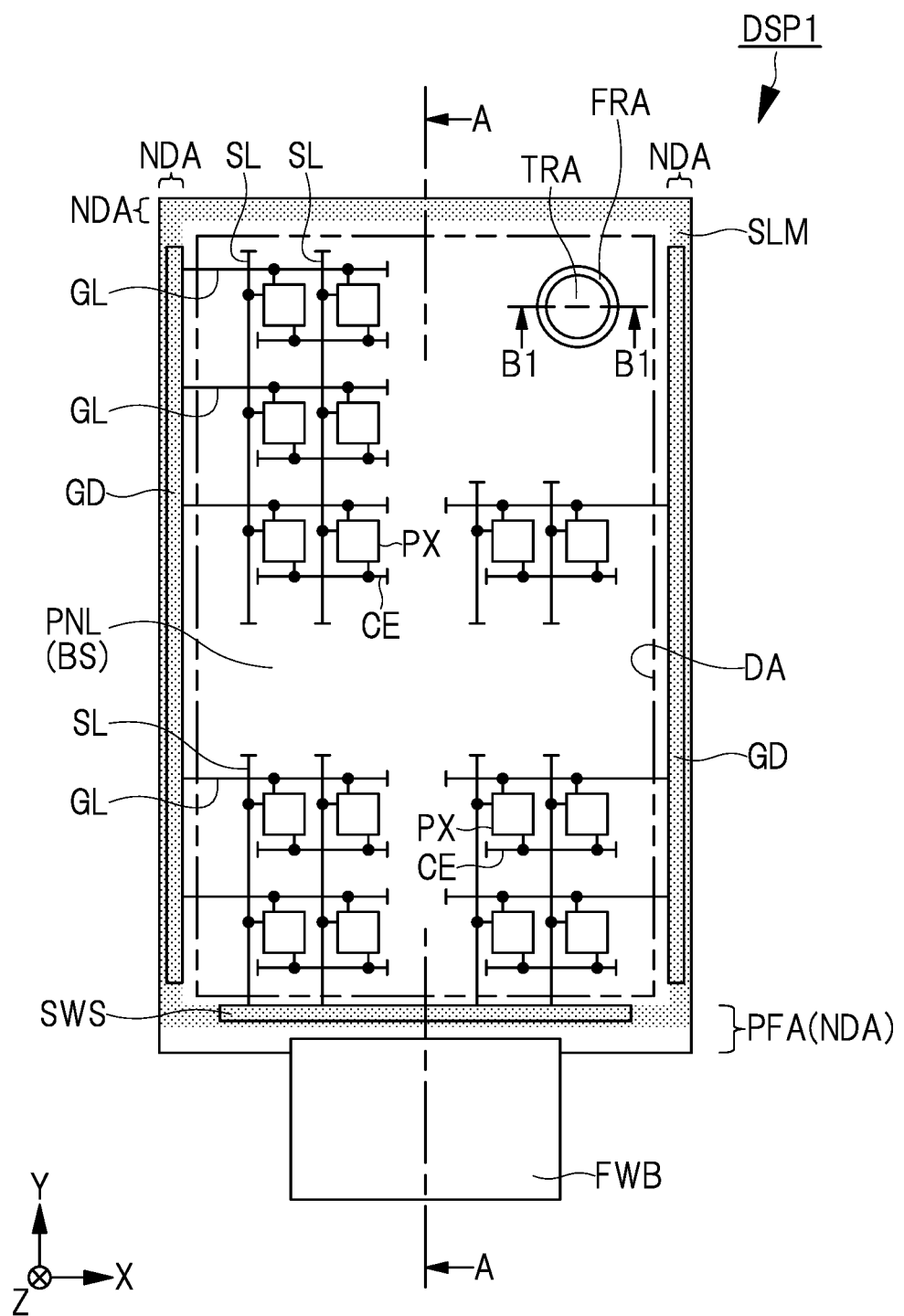
FIG. 1 is a bottom view showing a display device according to the first embodiment.

Hereinafter, embodiments of the present invention will be described with reference to the accompanying drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape, and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

Also, in the drawings used in the embodiments, hatching is omitted even in a cross-sectional view and hatching is applied even in a plan view in some cases in order to make the drawings easy to see.

In addition, the X direction, the Y direction, and the Z direction shown in the drawings are orthogonal to each other. In the following description, the X direction and the Y direction are defined as horizontal directions and the Z direction is defined as a height direction (thickness direction) of a structure in some cases.

First Embodiment

Hereinafter, a display device configured to display various images in a display region will be described as an electro-optical device having a panel including an electro-optical layer such as a liquid crystal layer. Note that, in the first embodiment, a display device mainly used in an electronic equipment such as a smartphone or a tablet terminal device will be described, but the display device includes a shutter liquid crystal element for controlling the light transmission used for a rearview mirror of a vehicle or the like.

The display devices including the liquid crystal layer are broadly classified into the following two groups depending on the direction of application of an electric field for changing the alignment of liquid crystal molecules of the liquid crystal layer. Namely, the first group is the so-called vertical field mode in which electric field is applied in a thickness direction of the display device or an out-of-plane direction of the display surface. The vertical field mode includes, for example, the TN (Twisted Nematic) mode and the VA (Vertical Alignment) mode. Also, the second group is the so-called transverse field mode in which electric field is applied in a planar direction of the display device or an in-plane direction of the display surface. The transverse field mode includes, for example, the IPS (In-Plane Switching) mode and the FFS (Fringe Field Switching) mode which is one of the IPS modes. The technique described below can be applied to any of the vertical field mode and the transverse field mode, and the display device of the transverse field mode will be described in the first embodiment.

Hereinafter, a display device DSP1 which is an electro-optical device according to the first embodiment will be described in detail with reference to FIG. 1 to FIG. 6. First, the overall structure of the display device DSP1 will be described with reference to FIG. 1 to FIG. 3, and then a peripheral structure of a transparent region TRA constituting the main features of the first embodiment will be described.

<Configuration of Display Device DSP1>

FIG. 1 is a bottom view showing the display device DSP1 according to the first embodiment, in which the display device DSP1 is seen from a back surface BS of a panel PNL. FIG. 1 shows the general layout of the panel PNL in the display device DSP1.

As shown in FIG. 1, the panel PNL includes a display region DA in which an image is formed in accordance with an input signal supplied from outside of the display device DSP1 and a non-display region NDA located in the periphery of the display region DA in a plan view. The display region DA is an effective region in which an image is displayed in a plan view.

In FIG. 1, the boundary between the display region DA and the non-display region NDA in a plan view is indicated by a two-dot chain line. The display region DA is a region in which a liquid crystal layer (electro-optical layer) LQ shown in FIG. 2 and others is formed, and the display region DA is surrounded by the non-display region NDA in a plan view. In other words, the non-display region NDA is a region in which the liquid crystal layer LQ is not formed. Although the display region DA shown in FIG. 1 is a quadrangle, the display region DA may have a shape other than a quadrangle, such as a polygon or a circle.

The non-display region NDA includes a peripheral region PFA adjacent to the display region DA. The peripheral region PFA is electrically connected to a wiring board (flexible wiring board) FWB disposed outside the display device DSP1, a circuit board CB shown in FIG. 2, and others.

Also, though described later with reference to FIG. 2 and others, a substrate SUB1 and a substrate SUB2 which are main structural components of the panel PNL are, for example, glass substrates and may be flexible resin substrates. The wiring board FWB, the circuit board CB, and others are folded to the back side of a backlight unit BLU. Therefore, in actual, the wiring board FWB and the circuit board CB are not visually recognized in a plan view when the panel PNL is seen from the normal direction (Z direction) to the display region DA.

Also, in FIG. 1, dot patterns are applied to a region (sealing region) in which a sealing material (adhesive) SLM is disposed in a plan view. The sealing material SLM is formed in the non-display region NDA including a part of the peripheral region PFA so as to surround the periphery of the display region DA, and is not formed in the display region DA.

Also, in the display region DA, a plurality of gate lines (scanning lines) GL extend in an X direction, and a plurality of source lines (signal lines, video signal lines) SL extend in a Y direction. The plurality of gate lines GL are arranged at intervals in the Y direction, and the plurality of source lines SL are arranged at intervals in the X direction. The position where each gate line GL and each source line SL intersect is a region in which a pixel PX is formed. A common electrode CE is electrically connected to a common electrode drive circuit formed on the wiring board FWB. A drive potential common to a plurality of pixels PX is supplied to the common electrode CE during the display period.

The plurality of gate lines GL are drawn out to the non-display region NDA outside the display region DA, and are connected to a gate drive circuit (scanning line drive circuit) GD. The plurality of source lines SL are drawn out to the non-display region NDA outside the display region DA, and are connected to a switch circuit unit SWS. Although not shown in detail, the gate drive circuit GD and the switch circuit unit SWS are electrically connected to the wiring board FWB via wiring formed in the panel PNL.

Also, the panel PNL includes the transparent region TRA and a frame region FRA provided inside the display region DA in a plan view. Note that the transparent region TRA may be simply expressed as a first region. When the transparent region TRA is expressed as the first region as mentioned above, the frame region FRA may be simply expressed as a second region. The frame region FRA surrounds the transparent region TRA in a plan view and is provided between the display region DA and the transparent region TRA. Further, the frame region FRA is blocked from light by a light-blocking film BM and a print region (light-blocking layer) PR described later. For this reason, the frame region FRA can be restated as "light-blocking region".

Apart of the frame region FRA and the transparent region TRA are regions in which a component such as a camera module CAM (see FIG. 6) is mounted to the display device DSP1. The transparent region TRA is made of a material that can transmit the visible light so that the visible light from the outside of the display device DSP1 enters the camera module CAM. Note that, in the region in which the camera module CAM is mounted, a component such as a microphone or a speaker may be mounted in addition to the camera module CAM.

Figure 2:
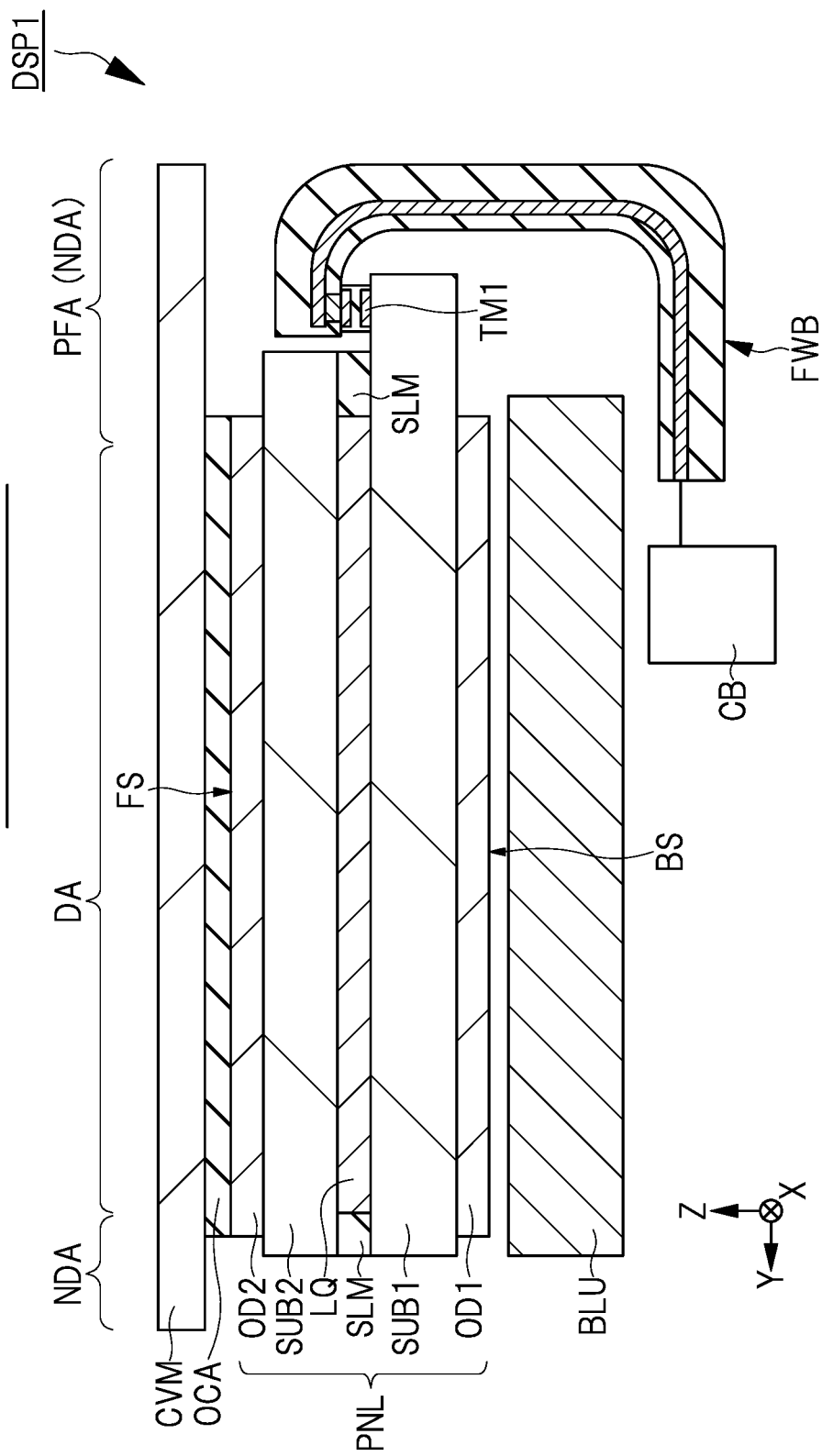
FIG. 2 is a cross-sectional view showing the display device according to the first embodiment.

FIG. 2 is a cross-sectional view taken along the line A-A shown in FIG. 1.

As shown in FIG. 2, in the display region DA, the panel PNL includes the substrate SUB1, the substrate SUB2 provided above the substrate SUB1, and the liquid crystal layer (electro-optical layer) LQ formed between the substrate SUB1 and the substrate SUB2. The substrate SUB1 and the substrate SUB2 face each other in the Z direction (thickness direction). The liquid crystal layer LQ is disposed inside the sealing material SLM with which a front surface of the substrate SUB1 and a back surface of the substrate SUB2 are bonded.

The panel PNL according to the first embodiment includes a polarizing plate (optical element) OD1 and a polarizing plate (optical element) OD2. The polarizing plate OD1 is provided below the substrate SUB1, and the polarizing plate OD2 is provided above the substrate SUB2. In other words, the polarizing plate OD1 is provided on the back side of the substrate SUB1, and the polarizing plate OD2 is provided on the front side of the substrate SUB2. Each of the polarizing plates OD1 and OD2 may include a retardation plate as necessary.

Also, in the display region DA, the front side of the substrate SUB2 corresponds to the display surface side of the panel PNL (display device DSP1). In the first embodiment, the front surface of the panel PNL is shown as a front surface FS, and the back surface of the panel PNL is shown as a back surface BS.

The backlight unit BLU is provided below the back surface BS of the panel PNL via the polarizing plate OD1. The backlight unit BLU has a function of emitting light in a direction from the substrate SUB1 to the substrate SUB2.

A cover member CVM is provided above the front surface FS of the panel PNL via an adhesive layer (optical adhesive tape) OCA so as to cover the display surface of the display device DSP1. The cover member CVM is a member for protecting the panel PNL, and is made of, for example, glass.

In the non-display region NDA, the substrate SUB1 and the substrate SUB2 are bonded via the sealing material SLM. The sealing material SLM also has a function of sealing the liquid crystal to be the liquid crystal layer LQ between the substrate SUB1 and the substrate SUB2.

A part of the wiring board FWB is provided at a position overlapping with the backlight unit BLU in a plan view, and the wiring board FWB is electrically connected to a terminal TM1 formed on the substrate SUB1. As with a part of the wiring board FWB, the circuit board CB is provided at a position overlapping with the backlight unit BLU in a plan view, and is electrically connected to the wiring inside the wiring board FWB.

Figure 3:
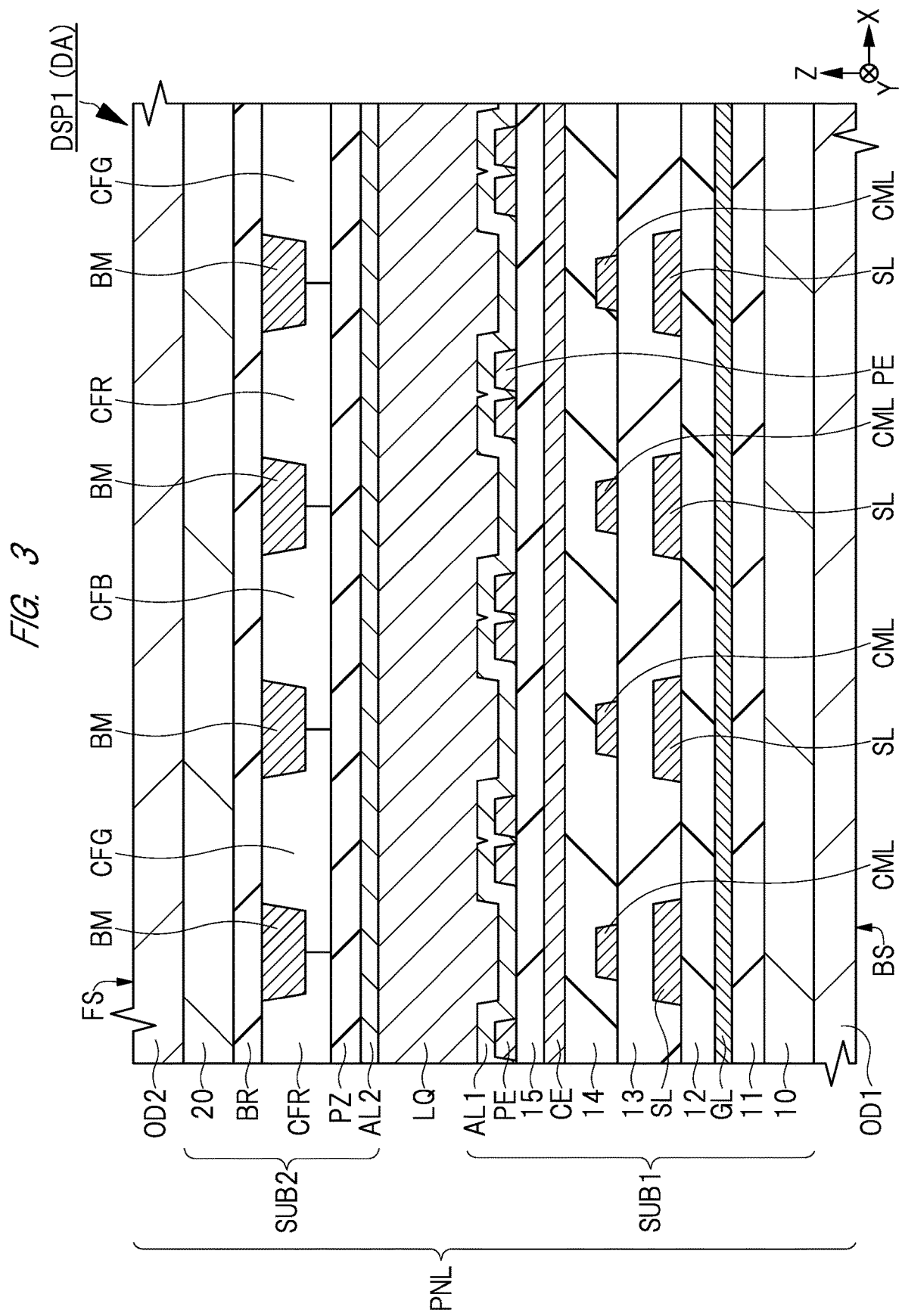
FIG. 3 is a cross-sectional view showing a principal part of the display device according to the first embodiment.

FIG. 3 is a partially enlarged cross-sectional view showing a principal part of the display region DA, and shows a detailed structure of the inside of the substrate SUB1 and the substrate SUB2 in the display region DA. Also, the gate line GL, the source line SL, the common electrode CE, the common signal line CML, and the pixel electrode PE which will be described below may actually be formed in different cross sections, but FIG. 3 intends to show the positional relationship thereof in the Z direction.

First, a detailed structure of the substrate SUB1 formed above the polarizing plate OD1 in the panel PNL will be described.

The substrate SUB1 includes a support substrate (insulative substrate) 10 having a property of transmitting the visible light. The support substrate 10 is, for example, a glass substrate.

An insulating film 11 made of an inorganic material is formed over the support substrate 10. The insulating film 11 is, for example, a single film such as a silicon nitride (SiN) film, a silicon oxide (SiO) film, a silicon oxynitride (SiON) film, or an aluminum oxide (AlOx) film or a stacked film obtained by stacking these films as appropriate. These films have an effect of preventing penetration of moisture, and function as barrier films.

The gate line GL is formed as a first conductive layer on the insulating film 11. The gate line GL is a light-blocking metal film containing, for example, molybdenum (Mo) or tungsten (W) as a main component. Note that the gate line GL is electrically connected to a gate electrode of the transistor. Alternatively, the gate line GL may constitute a gate electrode of the transistor in some cases.

An insulating film 12 made of an inorganic material is formed over the insulating film 11 so as to cover the gate line GL. The material constituting the insulating film 12 is the same as that of the insulating film 11. Also, a transistor having a gate electrode, a semiconductor layer, and others is formed between the insulating film 11 and the insulating film 12.

The source line SL is formed as a second conductive layer on the insulating film 12. The source line SL is, for example, a stacked film obtained by stacking light-blocking metal films such as an aluminum (Al) film, a titanium (Ti) film, and a titanium nitride (TiN) film. Note that the source line SL is electrically connected to a source electrode of the transistor. An insulating film 13 is formed as an organic film over the insulating film 12 so as to cover the source line SL. The insulating film 13 is, for example, an acrylic resin film and is made of a photosensitive resin material.

A common signal line CML is formed as a third conductive layer on the insulating film 13. The common signal line CML is a wiring connected to the common electrode CE described later and configured to supply a common potential or a touch detection potential to the common electrode CE. The material constituting the common signal line CML is the same as that of the source line SL. An insulating film 14 made of an organic material is formed over the insulating film 13 so as to cover the common signal line CML. The material constituting the insulating film 14 is the same as that of the insulating film 13. The insulating film 13 and the insulating film 14 serve as planarization films.

The common electrode CE is formed as a fourth conductive layer on the insulating film 14. The common electrode CE is made of a conductive material having high transparency such as ITO (Indium Tin Oxide) or IZO (Indium Zinc Oxide), and is made of a conductive metal oxide. The common electrode CE is an electrode for driving the pixel electrode PE and the liquid crystal layer LQ described later and also has a function as a touch detection electrode when the panel PNL constitutes a touch panel though not described in detail. An insulating film 15 made of an inorganic material is formed over the insulating film 14 so as to cover the common electrode CE. The material constituting the insulating film 15 is the same as that of the insulating film 11. The insulating film 15 is a capacitive insulating film between the pixel electrode PE and the common electrode CE.

The pixel electrode PE is formed as a fifth conductive layer on the insulating film 15. The material constituting the pixel electrode PE is the same as that of the common electrode CE. Also, in the first embodiment, a plurality of pixel electrodes PE are located between the two adjacent source lines SL in a plan view. An alignment film AL1 which is an organic film is formed over the insulating film 15 so as to cover the pixel electrode PE. The alignment film AL1 has a function of aligning the initial orientation of the liquid crystal molecules included in the liquid crystal layer LQ, and is made of, for example, a resin material such as polyimide. Further, the alignment film AL1 is in contact with the liquid crystal layer LQ.

Next, a detailed structure of the substrate SUB2 formed below the polarizing plate OD2 in the panel PNL will be described.

The substrate SUB2 includes a support substrate (insulative substrate) 20 having a property of transmitting the visible light. The support substrate 20 is, for example, a glass substrate.

A barrier film BR, a light-blocking film (black matrix) BM, a color filter CFR, a color filter CFG, a color filter CFB, a planarization film PZ, and an alignment film AL2 are formed between the support substrate 20 and the liquid crystal layer LQ.

The barrier film BR is formed over the entire back surface of the support substrate 20. The barrier film BR is made of an inorganic material and is, for example, an inorganic insulating film containing at least one of silicon nitride, silicon oxide, silicon oxynitride, and aluminum oxide. Further, the barrier film BR is provided for preventing the moisture from penetrating into the color filters CFR, CFG, and CFB, the liquid crystal layer LQ, and the like when the moisture existing outside the support substrate 20 has penetrated into the support substrate 20. However, the substrate SUB2 may have the structure without the barrier film BR.

On the back surface side of the support substrate 20, color filters of three colors (color conversion layer) are formed via the barrier film BR. In the first embodiment, the red (R) color filter CFR, the green (G) color filter CFG, and the blue (B) color filter CFB are cyclically arranged. In the display device DSP1, for example, a color image is displayed by forming pixels of three colors of red (R), green (G), and blue (B) as one set. The plurality of color filters CFR, CFG, and CFB of the substrate SUB2 are disposed at positions facing the respective pixels PX including the pixel electrodes PE formed in the substrate SUB1. Note that the types of the color filters are not limited to three colors of red (R), green (G), and blue (B). In addition, the color filters CFR, CFG, and CFB of the first embodiment include the color conversion layer which can change the wavelength of the light passing through itself.

Also, the light-blocking film BM is disposed at each of the boundaries between the plurality of color filters CFR, CFG, and CFB. The light-blocking film BM is made of, for example, black resin or low-reflective metal. For example, the light-blocking film BM is formed in a lattice shape in the display region DA in a plan view. In other words, the light-blocking film BM extends in the X direction and the Y direction, and has openings at positions overlapping with the pixel electrodes PE in a plan view. As described above, by dividing each pixel PX by the light-blocking film BM, it is possible to suppress the occurrence of light leakage and color mixing in each of the color filters CFR, CFG, and CFB. In general, among the openings of the light-blocking film BM, the edges of the openings formed closest to the outer perimeter are defined as the boundary between the display region DA and the non-display region NDA. As will be described later, the light-blocking film BM is formed also in the frame region FRA, but the light-blocking film BM in the frame region FRA and the non-display region NDA does not have the lattice shape.

The planarization film PZ covers the color filters CFR, CFG, and CFB on the back surface side of the support substrate 20. The planarization film PZ is an insulating film made of an organic resin material. The planarization film PZ is a protective film for preventing impurities from diffusing from the color filters CFR, CFG, and CFB to the liquid crystal layer LQ, and also has a function of removing the step difference between the color filters CFR, CFG, and CFB and the light-blocking film BM. Further, the planarization film PZ is also referred to as an overcoat film.

The alignment film AL2 is in contact with the liquid crystal layer LQ and is formed between the liquid crystal layer LQ and the planarization film PZ. The alignment film AL2 is made of the same material as the alignment film AL1, and has the same function as the alignment film AL1.

Also, in the configuration described above, each of the support substrate 10, the insulating films 11 to 15, the common electrode CE, the pixel electrode PE, the alignment film AL1, the alignment film AL2, the planarization film PZ, the barrier film BR, and the support substrate 20 has a function of being able to transmit the visible light. In addition, in the configuration described above, each of the gate line GL, the source line SL, the common signal line CML, and the light-blocking film BM has a function of being unable to transmit the visible light. Therefore, it is preferable that the metal wiring and the light-blocking film BM having a property of being unable to transmit the visible light are not formed in the transparent region TRA, but these may be formed in a part of the transparent region TRA if the function of the camera module CAM is not significantly impaired as compared with the display region DA.

<Configuration of Periphery of Transparent Region TRA>

Figure 4:
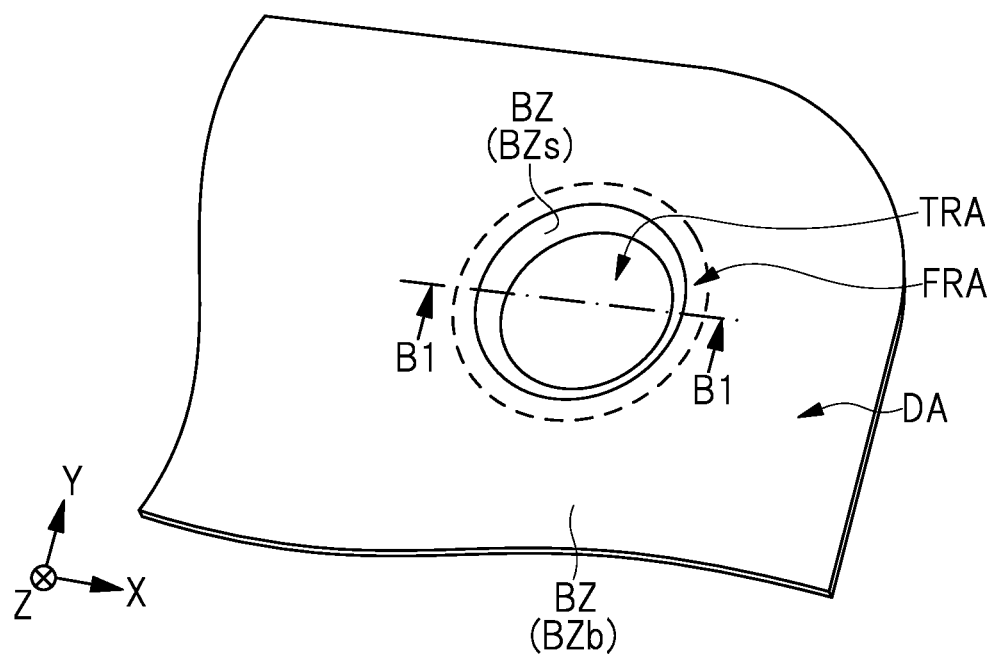
FIG. 4 is a perspective view showing a shape of a bezel according to the first embodiment.

FIG. 4 is a perspective view showing a shape of a bezel (housing) BZ that covers the lower side of the backlight unit BLU used in the display device DSP1 according to the first embodiment. The bezel BZ has a function of being unable to transmit the visible light, and is made of one kind of metal or an alloy containing several kinds of metals, for example, stainless steel.

In the first embodiment, the bezel BZ and the backlight unit BLU are treated as different structural components, but the bezel BZ may be included in the backlight unit BLU as a part of the structure of the backlight unit BLU. Also, a tape TP1 described later may also be treated as a part of the structure of the backlight unit BLU. Further, the "bezel" may be restated as "chassis", "frame", "housing", or the like.

Most of the bezel BZ is constituted of a bottom portion BZb parallel to a horizontal plane constituted by the X direction and the Y direction. However, in the frame region FRA around the transparent region TRA, the bezel BZ is bent in the Z direction, and this bent part is shown as a side portion BZs of the bezel BZ. The side portion BZs can be formed by, for example, bending a part of the bezel BZ (bottom portion BZb) and pulling the bent part.

Although not shown here, a plurality of holes may be provided at a corner portion formed by the side portion BZs and the bottom portion BZb of the bezel BZ for the purpose of improving the adhesion to a resin film such as the frame adhered to the bezel BZ in the outer periphery of the bezel BZ.

Figure 5:
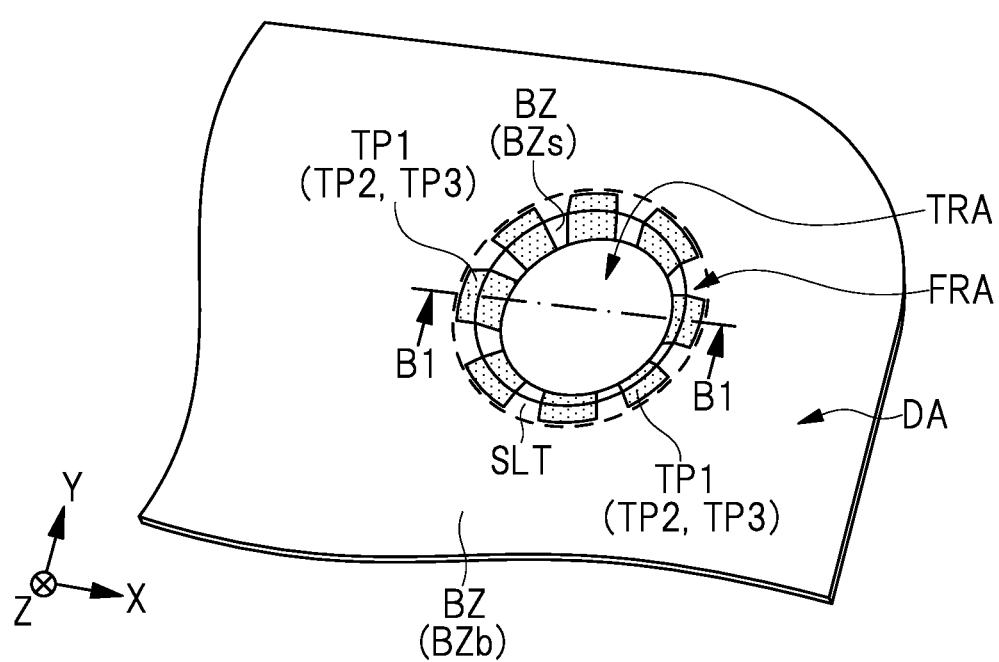
FIG. 5 is a perspective view showing the shape of the bezel to which a tape is attached according to the first embodiment.

FIG. 5 is a perspective view showing a shape of the bezel BZ to which the tape TP1 is attached.

The tape TP1 is a member used for the bezel BZ and is adhered to the bottom portion BZb and the side portion BZs of the bezel BZ. Also, since a slit SLT is provided in a part of the tape TP1, a part of the side portion BZs of the bezel BZ is exposed from the tape TP1.

The tape TP1 includes a double-sided tape TP2 and a single-sided tape TP3. One side of the double-sided tape TP2 is directly adhered to the bezel BZ, and the other side of the double-sided tape TP2 is adhered to one side of the single-sided tape TP3. The adhesive force of the other side of the single-sided tape TP3 that is not adhered to the double-sided tape TP2 is smaller than the adhesive force of the one side that is adhered to the double-sided tape TP2, and is smaller than the adhesive forces of both sides of the double-sided tape TP2.

FIG. 6 is a cross-sectional view taken along the line B1-B1 in FIG. 1, FIG. 4, and FIG. 5 and showing the structure of the display device DSP1 around the transparent region TRA.

As shown in FIG. 6, the camera module CAM and the backlight unit BLU are provided below the panel PNL. The camera module CAM is provided so as to overlap with a part of the frame region FRA and the transparent region TRA in a plan view, and the backlight unit BLU is provided in the frame region FRA and the display region DA so as not to overlap with the transparent region TRA in a plan view.

In other words, the backlight unit BLU has an opening OP1 at a position overlapping with the transparent region TRA, and the camera module CAM is inserted in the opening OP1.

An adhesive layer OCA is provided between the substrate SUB2 and the cover member CVM. Also, the polarizing plate OD2 and the polarizing plate OD1 are formed so as not to extend to the transparent region TRA, and the side surfaces thereof are located in the frame region FRA. By arranging the polarizing plate OD2 and the polarizing plate OD1 so as to avoid the transparent region TRA, transparency in the transparent region TRA is ensured.

In other words, the polarizing plate OD1 and the polarizing plate OD2 have an opening OP2 and an opening OP3 at the position overlapping with the transparent region TRA, respectively. The opening OP2 and the opening OP3 overlap with the transparent region TRA, the opening OP1 of the backlight unit, and the camera module CAM.

Structural components made of a material that cannot transmit the visible light such as the gate line GL, the source line SL, the common signal line CML, the light-blocking film BM, and the transistor are not formed in the panel PNL in the transparent region TRA. In other words, structural components made of a material capable of transmitting the visible light are formed in the panel PNL in the transparent region TRA. For example, the panel PNL in the transparent region TRA includes all or part of the structural components such as the support substrate 10, the insulating films 11 to 15, the common electrode CE, the pixel electrode PE, the alignment film AL1, the liquid crystal layer LQ, the alignment film AL2, the planarization film PZ, the barrier film BR, and the support substrate 20.

Since the panel PNL in the transparent region TRA is configured of the above-mentioned structural components, light from the outside of the display device DSP1 can enter the camera module CAM mounted below the panel PNL.

Also, the display panel PNL is not limited to the above-mentioned structure, and may be configured such that a through hole is formed from the substrate SUB1 to the substrate SUB2 in the region of the transparent region TRA. In this case, the through holes of the substrate SUB1 and the substrate SUB2 overlap with the opening OP1 of the backlight unit BLU, and the polarizing plate OD1 and the polarizing plate OD2 have the opening OP2 and the opening OP3 overlapping with the transparent region TRA, respectively. In the case of such a structure, understandably, the liquid crystal layer LQ does not exist in the transparent region TRA, and is provided in the display region DA between the non-display region NDA and the frame region FRA by the sealing material SLM formed in the frame region FRA. As a result, the transparency of the transparent region TRA can be greatly improved.

The cover member CVM is provided above the panel PNL so as to cover the transparent region TRA, the frame region FRA, and the display region DA. In the frame region FRA, the print region PR made of, for example, black ink is formed on a part of the cover member CVM, and the light-blocking film BM made of, for example, black resin or low-reflective metal is formed between the substrate SUB2 and the substrate SUB1. Each of the print region PR and the light-blocking film BM has a function of blocking the visible light. Therefore, it is possible to prevent light from the periphery of the transparent region TRA from being mixed into the lens of the camera provided in the camera module CAM.

However, since the frame region FRA is blocked from light by the light-blocking film BM, the print region PR of the cover member CVM may not be provided.

The bottom portion BZb of the bezel BZ covers the lower side of the backlight unit BLU, and the side portion BZs of the bezel BZ is provided at the side of the backlight unit BLU. Although not shown, the backlight unit BLU and the bottom portion BZb of the bezel BZ are adhered by an adhesive layer such as double-sided tape. The backlight unit BLU includes a reflection film RF provided on the bottom portion BZb of the bezel BZ via the adhesive layer, a light guide layer LGP formed on the reflection film RF, and an optical sheet formed on the light guide layer LGP. The optical sheet includes a diffusion sheet OPS1 formed on the light guide layer LGP and a prism sheet OPS2 formed on the diffusion sheet OPS1.

In other words, the opening OP1 of the backlight unit BLU is the region surrounded by the side portion BZs of the bezel BZ. Also, the opening OP1 of the backlight unit BLU can be restated as an opening formed in each of the reflection film RF, the light guide layer LGP, the diffusion sheet OPS1, and the prism sheet OPS2. Namely, each of the reflection film RF, the light guide layer LGP, the diffusion sheet OPS1, and the prism sheet OPS2 has the opening OP1.

Although not shown here, a light source such as a laser diode is provided in the vicinity of the backlight unit BLU of the display device DSP1. The light emitted from the laser diode propagates inside the light guide layer LGP, and is diffused by the diffusion sheet OPS1 to be a more uniform surface light source. The light which has passed through the diffusion sheet OPS1 is oriented in the direction along the Z direction by the prism sheet OPS2. The reflection film RF has a function of reflecting the light emitted to the side opposite to the panel PNL and returning the reflected light to the panel PNL in order to improve the brightness of the display device DPS1.

In the frame region FRA, a resin film (tape) RZ is provided below the panel PNL (substrate SUB1). The resin film RZ is located at the side of the polarizing plate OD1 and is closer to the transparent region TRA than the polarizing plate OD1 is. The resin film RZ is a film selectively formed on the substrate SUB1 by, for example, the coating method, and is an organic insulating film such as polyimide. Further, the resin film RZ has a function of blocking the visible light, and is made of, for example, a material containing a black dye.

Note that the resin film RZ may be a tape in which an adhesive sheet and a resin film having a smaller adhesive force than that of the adhesive sheet are laminated. In that case, by mixing, for example, a black dye into the adhesive sheet and the resin film, a function of blocking the visible light is given to the resin film (tape) RZ.

In the frame region FRA, the bezel BZ, the panel PNL, and the backlight unit BLU are adhered to each other by the tape TP1 having a light-blocking property and a function of blocking the visible light. Specifically, the double-sided tape TP2 is provided between the polarizing plate OD1 and the prism sheet OPS2 and between the resin film RZ and the tip of the side portion BZs of the bezel BZ. Further, the double-sided tape TP2 is provided from the side portion BZs to the bottom portion BZb of the bezel BZ, and the single-sided tape TP3 covers the side portion BZs and the bottom portion BZb of the bezel BZ via the double-sided tape TP2.

The double-sided tape TP2 is actually composed of a plurality of thin films such as an upper adhesive sheet, a resin film, and a lower adhesive sheet. Here, by mixing, for example, a black dye into each thin film, a function of blocking the visible light is given to each thin film. Namely, the double-sided tape TP2 has a function of blocking a specific wavelength, has a light-blocking property, and has a function of blocking the visible light. Further, in order to secure a certain degree of adhesive force, the thickness of the double-sided tape TP2 is, for example, 40 to 60 μm.

The single-sided tape TP3 is a film made of, for example, a resin film, and the single-sided tape TP3 itself does not have an adhesive force and is adhered to the double-sided tape TP2 by the adhesive force of the double-sided tape TP2 itself. The single-sided tape (film) TP3 is a protective tape that does not have to be adhered to the bezel BZ and is provided such that a foreign matter or the like is not adhered to the double-sided tape TP2.

However, the single-sided tape TP3 may have an adhesive force. In this case, the single-sided tape TP3 is composed of an adhesive sheet provided on the surface to be adhered to the double-sided tape TP2 and a resin film having an adhesive force smaller than that of the adhesive sheet. In this case, the same tape as that of the above-mentioned resin film RZ can be used as the single-sided tape TP3. Namely, the side of the single-sided tape TP3 that is not adhered to the double-sided tape TP2 has an adhesive force smaller than that of both sides of the double-sided tape TP2, and preferably has no adhesive force.

Also, the thickness of the single-sided tape TP3 is smaller than that of the double-sided tape TP2 and is, for example, 5 to 10 μm. Further, the single-sided tape TP3 may or may not have a function of blocking the visible light.

<Main Feature of Display Device DSP1 According to First Embodiment>

The light leaking from the backlight unit BLU includes light from the side of the backlight unit BLU. In the first embodiment, since the side portion BZs of the bezel BZ having a function of blocking the visible light is provided at the side of the backlight unit BLU, such light leakage can be suppressed. Therefore, it is possible to prevent the light emitted from the backlight unit BLU from leaking to the camera module CAM. As a result, the image generated by the camera module CAM becomes more accurate and clearer, so that the performance of the electronic equipment provided with the display device DSP1 can be improved.

Further, the study by the inventors of the present application has revealed that the light leaking from the backlight unit BLU also includes the light propagating inside the panel PNL. In particular, as shown in FIG. 6, light LI propagating inside the polarizing plate OD1 is less likely to be attenuated as compared with other parts of the panel PNL, and the light LI tends to propagate to the side surface of the polarizing plate OD1.

In the first embodiment, since the resin film RZ and the double-sided tape TP2 are provided at the side of the polarizing plate OD1 so as to surround the opening OP2 of the polarizing plate OD1, even if the light LI propagating inside the polarizing plate OD1 is present, it is possible to prevent the light LI from leaking to the camera module CAM.

FIG. 7 is a display device DSP3 according to an example studied by the inventors of the present application.

The structure of the display device DSP3 according to the studied example is substantially the same as the structure of the display device DSP1 according to the first embodiment, but the bezel BZ and the resin film RZ are adhered to each other by a resin film RZa having an adhesive force instead of the tape TP1. The resin film RZa is, for example, an organic insulating film such as polyimide formed by the coating method, and is made of the same material as the resin film RZ. Therefore, the resin film RZa also has a function of blocking the visible light. The display device DSP3 like this also can prevent the light emitted from the backlight unit BLU from leaking to the camera module CAM.

However, when the resin film RZa is formed on the side portion BZs of the bezel BZ by the coating method, the problems that the coating position is not stable and a part of the resin film RZa adheres to the transparent region TRA as a foreign matter RZb are likely to occur. Namely, it is difficult to form the resin film RZa only on the side portion BZs without forming the resin film RZa containing the foreign matter RZb in the transparent region TRA.

Also, when the resin film RZa does not have a certain thickness, the problems that the adhesive force between the bezel BZ and the resin film RZ is lowered and the resin film RZa cannot sufficiently exert the function of blocking the visible light occur. In order to suppress these problems as much as possible, it is effective to increase the width of the frame region FRA, but then the transparent region TRA or the display region DA becomes narrow.

On the other hand, in the first embodiment, since the double-sided tape TP2 is adopted, each of the bezel BZ, the panel PNL (resin film RZ, polarizing plate OD1), and the backlight unit BLU (prism sheet OPS2) can be easily adhered by the double-sided tape TP2. Therefore, the foreign matter RZb is not generated in the transparent region TRA. Also, since the double-sided tape TP2 is formed from the polarizing plate OD1 and the backlight unit BLU to the bezel BZ and the resin film RZ, the function of blocking the visible light is fully exerted in the display device DSP1. Further, since it is enough if the double-sided tape TP2 has a thickness capable of blocking the visible light and ensuring the adhesive force, it is not necessary to increase the width of the frame region FRA, and the transparent region TRA or the display region DA does not become narrow.

As described above, in the first embodiment, it is possible to provide the display device DSP1 in which the light emitted from the backlight unit BLU to the transparent region TRA is suppressed. Therefore, when the camera module CAM is mounted in the transparent region TRA, the image generated by the camera module CAM becomes clearer. Namely, if the technique described in the first embodiment is used, the performance of the electronic equipment provided with the display device DSP1 can be improved.

<Method of Manufacturing Display Device DSP1 According to First Embodiment>

Figure 12:
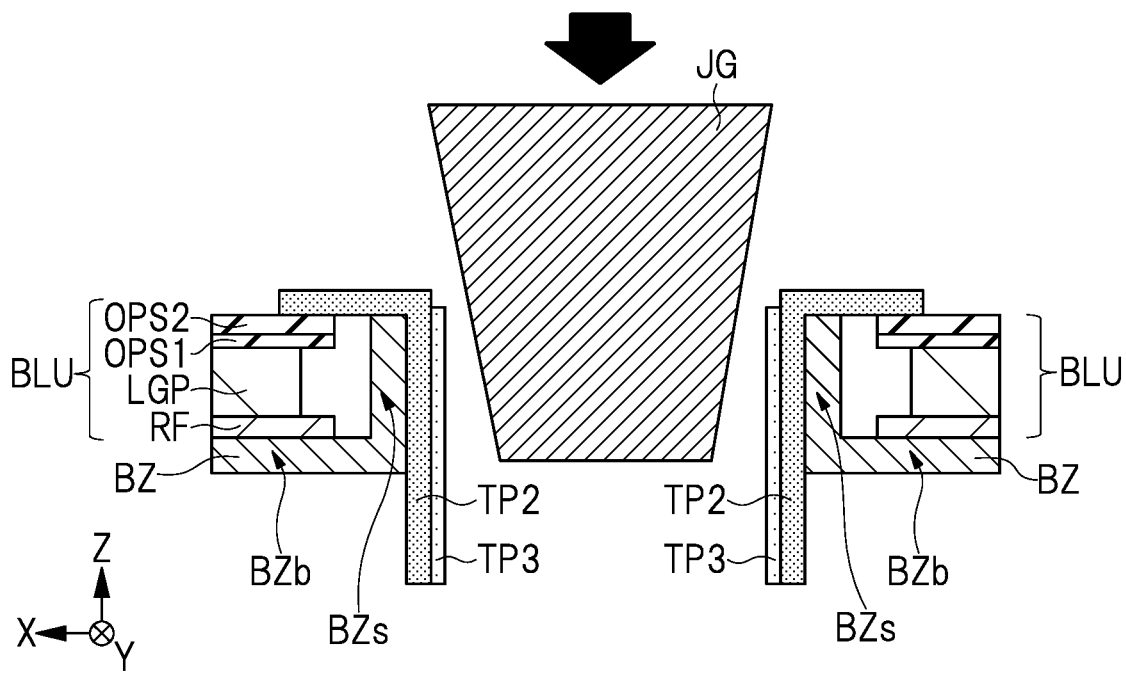
FIG. 12 is a cross-sectional view showing the method of manufacturing the display device continued from FIG. 11B.
Figure 13:
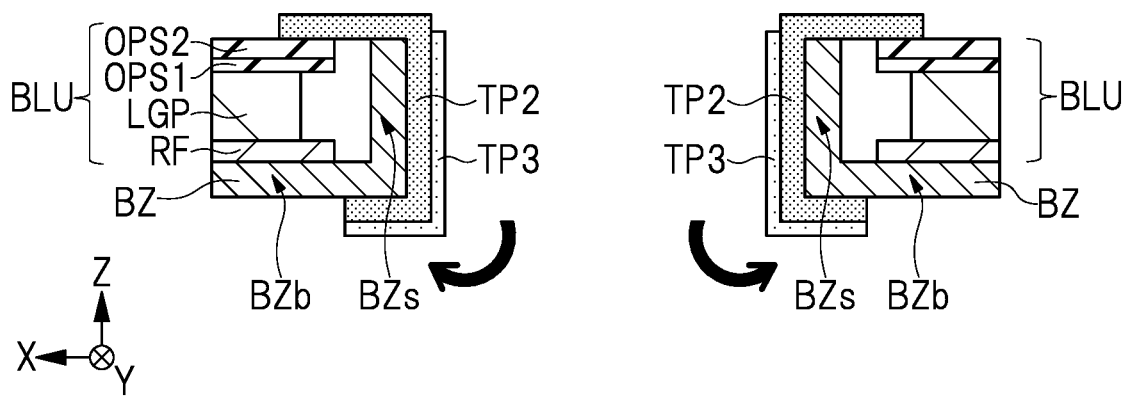
FIG. 13 is a cross-sectional view showing the method of manufacturing the display device continued from FIG. 12.

The method of manufacturing the display device DSP1 will be described below. FIG. 8B, FIG. 9B, FIG. 10B, and FIG. 11B are cross-sectional views taken along the line C-C shown in the plan views of FIG. 8A, FIG. 9A, FIG. 10A, and FIG. 11A, respectively. FIG. 12 and FIG. 13 are cross-sectional views showing the manufacturing process after FIG. 11B.

Figure 8A:
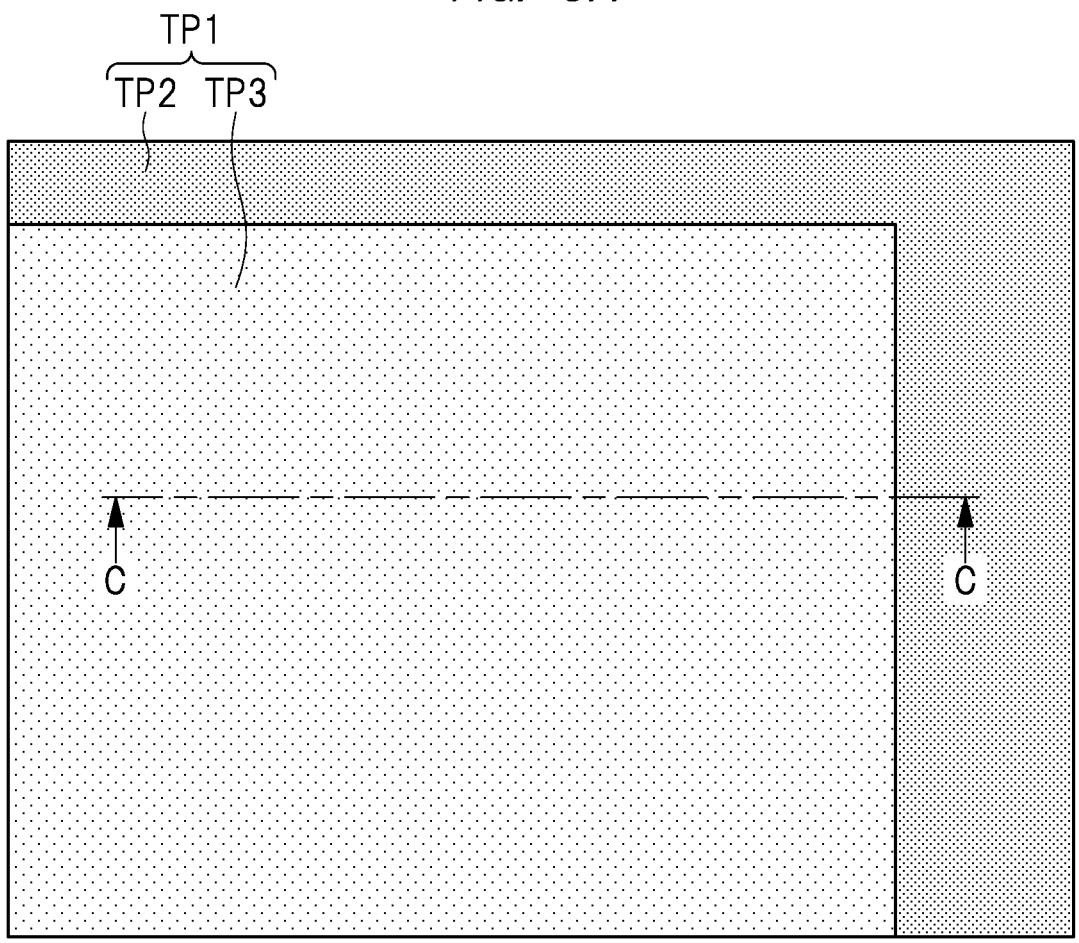
FIG. 8A is a plan view showing a method of manufacturing a display device according to the first embodiment.
Figure 8B:
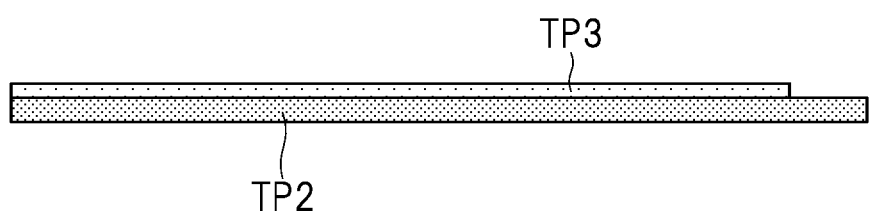
FIG. 8B is a cross-sectional view showing the method of manufacturing the display device according to the first embodiment.

First, as shown in FIG. 8A and FIG. 8B, the single-sided tape TP3 is bonded to the double-sided tape TP2 to prepare the tape TP1 made of a laminate thereof. In the drawings of the present application, the state where the single-sided tape TP3 is provided on the upper surface of the double-sided tape TP2 is shown for convenience, but the vertical relationship between them may be reversed.

Figure 9A:
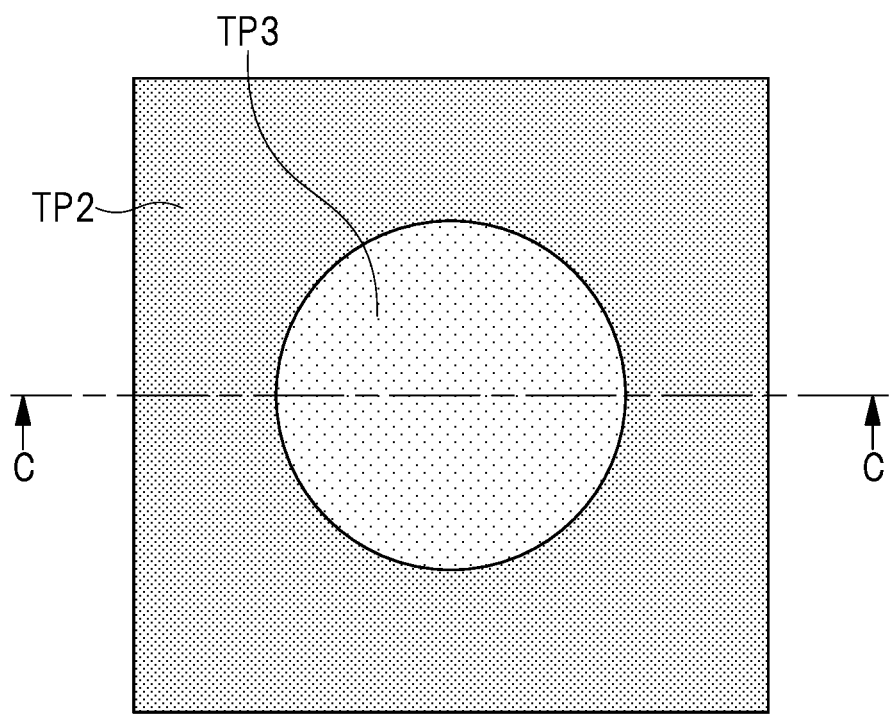
FIG. 9A is a plan view showing the method of manufacturing the display device continued from FIG. 8A.
Figure 9B:
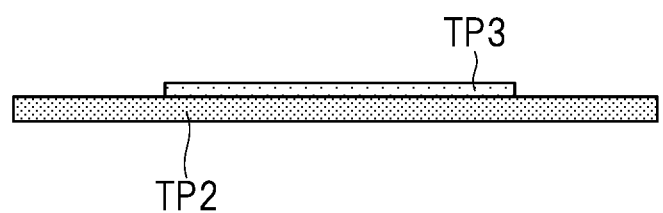
FIG. 9B is a cross-sectional view showing the method of manufacturing the display device continued from FIG. 8B.

Next, as shown in FIG. 9A and FIG. 9B, the shape of the double-sided tape TP2 is roughly processed, and the outer diameter of the single-sided tape TP3 is processed in detail. The single-sided tape TP3 is processed such that the region of the upper surface of the double-sided tape TP2 where the double-sided tape TP2 is to be adhered to the tip of the side portion BZs of the bezel BZ, the panel PNL, and the backlight unit BLU in a later process is exposed.

Figure 10A:
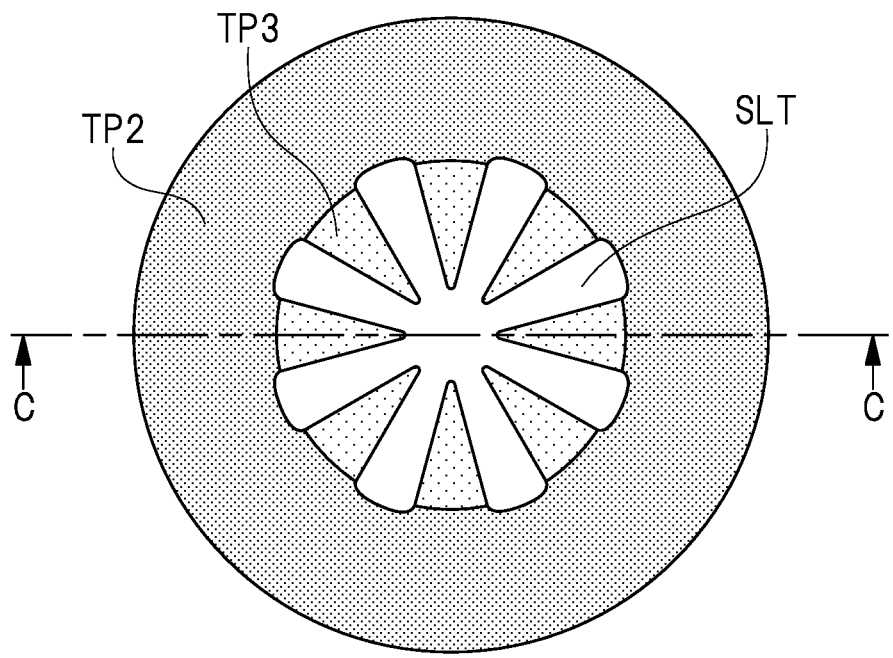
FIG. 10A is a plan view showing the method of manufacturing the display device continued from FIG. 9A.
Figure 10B:
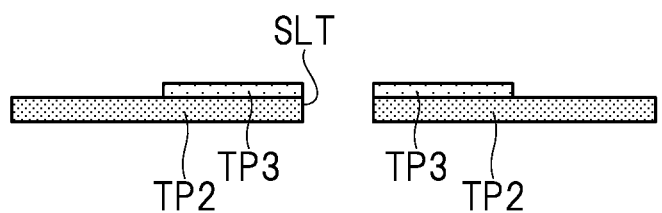
FIG. 10B is a cross-sectional view showing the method of manufacturing the display device continued from FIG. 9B.

Next, as shown in FIG. 10A and FIG. 10B, the outer diameter of the double-sided tape TP2 is processed, and the slit SLT is provided in the double-sided tape TP2 and the single-sided tape TP3. The slit SLT penetrates through the double-sided tape TP2 and the single-sided tape TP3 and has a planar shape that extends radially from the vicinity of the center of the double-sided tape TP2 and the single-sided tape TP3. The processing of the outer diameter of the double-sided tape TP2 and the formation of the slit SLT can be performed at the same time by using the same mold. As described above, the processed tape TP1 is prepared.

Next, the panel PNL, the backlight unit BLU, and the bezel BZ having the structures described above are prepared. Known techniques can be used for the detailed manufacturing processes thereof. Note that the order of the processes of preparing each of the panel PNL, the backlight unit BLU, the bezel BZ, and the processed tape TP1 is not limited.

Figure 11A:
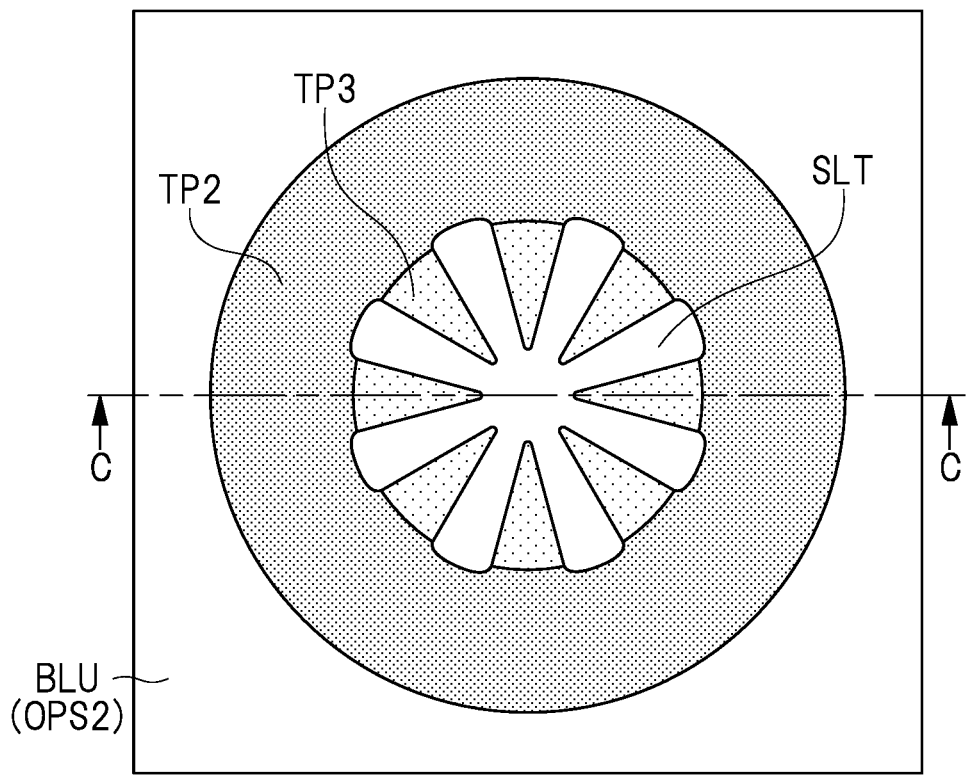
FIG. 11A is a plan view showing the method of manufacturing the display device continued from FIG. 10A.
Figure 11B:
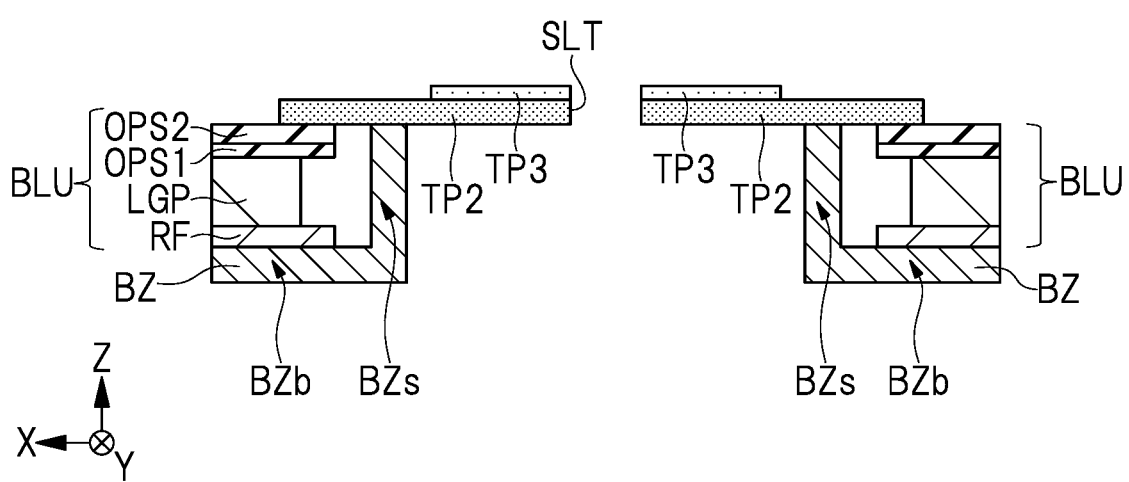
FIG. 11B is a cross-sectional view showing the method of manufacturing the display device continued from FIG. 10B.

As shown in FIG. 11A and FIG. 11B, first, the backlight unit BLU is mounted on the bezel BZ. The backlight unit BLU is provided on the bottom portion BZb of the bezel BZ via an adhesive layer (not shown), and the side of the backlight unit BLU is covered with the side portion BZs of the bezel BZ. Next, the portion of the double-sided tape TP2 exposed from the single-sided tape TP3 is bonded to the bezel BZ and the backlight unit BLU. Specifically, the double-sided tape TP2 is adhered to the tip of the side portion BZs of the bezel BZ and the upper surface of the backlight unit BLU (prism sheet OPS2).

Next, as shown in FIG. 12, the portion of the double-sided tape TP2 covered with the single-sided tape TP3 is bonded to the side portion BZs of the bezel BZ by using a jig JG. From the state where the tip of the jig JG is in contact with the single-sided tape TP3, the jig JG is pushed down in the direction from the upper side to the lower side of the backlight unit BLU. As a result, the double-sided tape TP2 is pressed to the jig JG via the single-sided tape TP3, and the double-sided tape TP2 is bonded to the side portion BZs of the bezel BZ. At this time, since the slit SLT is provided in the tape TP1 (double-sided tape TP2 and single-sided tape TP3), even if the tape TP1 is bent and stretched, strong stress is not applied to the tape TP1 and the tape TP1 is stably adhered to the side portion BZs of the bezel BZ.

Next, as shown in FIG. 13, the surplus double-sided tape TP2 and single-sided tape TP3 are bent, and the double-sided tape TP2 is bonded to the bottom portion BZb of the bezel BZ. Since the tape TP is bonded not only to the side portion BZs of the bezel BZ but also to the bottom portion BZb, the adhesive strength is improved. If the adhesive strength is sufficient, the tape TP1 does not have to be bonded to the bottom portion BZb of the bezel BZ. Note that FIG. 5 shows the state at the time when the process of FIG. 13 is completed, and shows the state in which the tape TP1 is bonded to the bottom portion BZb of the bezel BZ.

In this state, the portion of the double-sided tape TP2 that is bonded to the tip of the side portion BZs of the bezel BZ and the upper surface of the prism sheet OPS2 is exposed from the single-sided tape TP3. By adhering the exposed double-sided tape TP2 to the resin film RZ and the polarizing plate OD1 of the panel PNL, the display device DSP1 shown in FIG. 6 is manufactured. Thereafter, by mounting a component such as the camera module CAM in the transparent region TRA, the electronic equipment using the display device DSP1 is manufactured.

Second Embodiment

A display device DSP2 according to the second embodiment will be described below with reference to FIG. 14 to FIG. 16. Hereinafter, the difference from the first embodiment will be mainly described.

Figure 14:
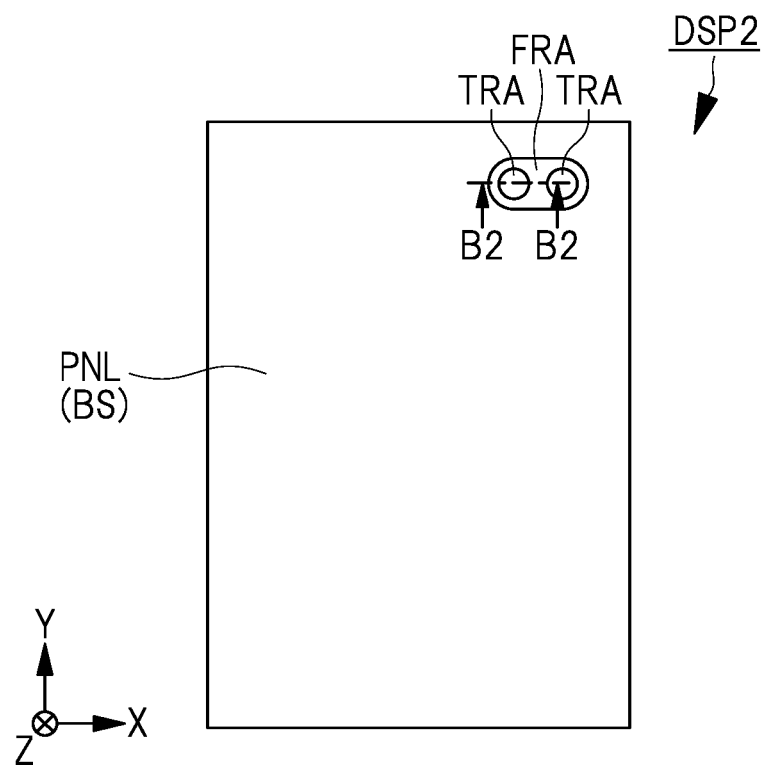
FIG. 14 is a bottom view showing a display device according to the second embodiment.
Figure 15:
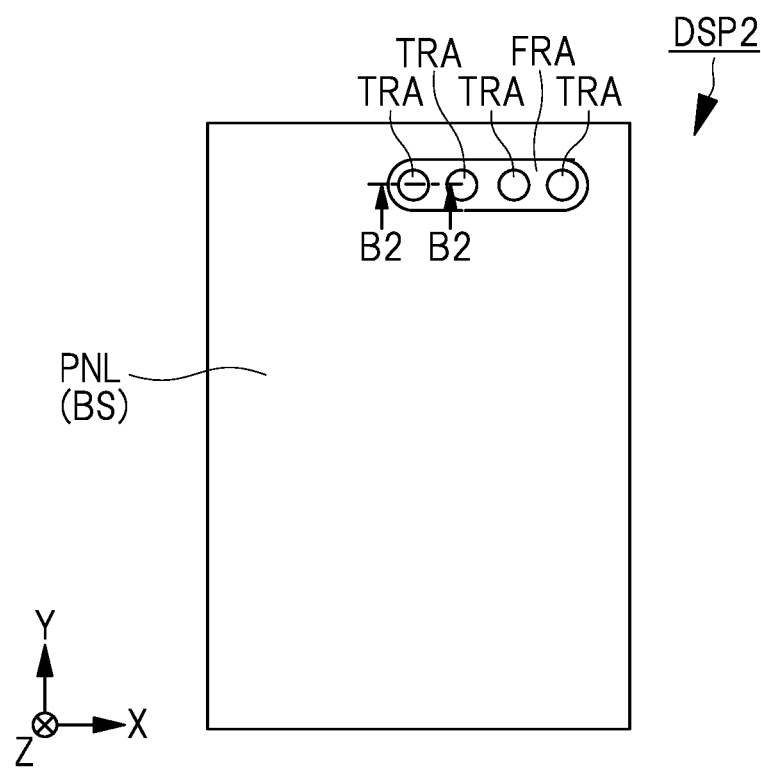
FIG. 15 is a bottom view showing a display device according to a modification.

FIG. 14 and FIG. 15 are bottom views of the panel PNL as with FIG. 1, but the illustration of configurations other than the transparent region TRA and the frame region FRA is omitted in FIG. 14 and FIG. 15 for the sake of simplification of the description. FIG. 16 shows a cross-section taken along the line B2-B2 shown in FIG. 14 and FIG. 15.

In the first embodiment above, the display device DSP1 provided with one transparent region TRA has been described, but the display device DSP2 provided with a plurality of transparent regions TRA will be described in the second embodiment. The display device DSP2 in FIG. 14 is provided with two transparent regions TRA, and the display device DSP2 in FIG. 15 which is a modification is provided with four transparent regions TRA.

As shown in FIG. 16, the structure of the frame region FRA adjacent to the display region DA is the same as that of FIG. 6, but the structure of the frame region FRA between the adjacent transparent regions TRA is slightly different from that of FIG. 6. The polarizing plates OD1 and OD2 are not provided in the frame region FRA between the adjacent transparent regions TRA, but the print region PR, the light-blocking film BM, and the resin film RZ are provided as a whole. Further, the double-sided tape TP2 is adhered to the resin film RZ so as to cover the entire upper side of the backlight unit BLU. Also in the frame region FRA between the adjacent transparent regions TRA, the tape TP1 (double-sided tape TP2) is adhered to the panel PNL, the backlight unit BLU, and the bezel BZ. Therefore, the light emitted from the backlight unit BLU is blocked by the double-sided tape TP2, the resin film RZ, and the bezel BZ.

Further, by providing the plurality of transparent regions TRA described above, a plurality of camera modules CAM can be mounted on an electronic equipment provided with the display device DSP2. Further, it is also possible to mount other components such as a proximity sensor instead of the camera module CAM. For example, even when the proximity sensor is provided in the transparent region TRA, there is a problem regarding the light leaking from the backlight unit BLU, but the display device DSP2 can suppress such light leakage as with the display device DSP1.

Also, since the resin film RZ is a film formed by processing a coating film or a tape processed into a predetermined shape, it is not necessary to add a new manufacturing process.

Further, when the tape TP1 is bonded to the side portion BZs of the bezel BZ, the bonding process is performed a number of times corresponding to the number of transparent regions TRA by using the jig JG shown in FIG. 12. Therefore, it is necessary to add the manufacturing processes by the number of transparent regions TRA. However, also in the studied example described with reference to FIG. 7, since the forming process of the resin film RZa is added by the number of transparent regions TRA, the additional number of manufacturing processes due to the increase of the transparent region TRA is almost the same between the second embodiment and the studied example.

Further, in the studied example, since the probability that the foreign matter RZb is generated in the transparent region TRA increases as the number of transparent regions TRA increases, the performance of the display device DSP3 may be further deteriorated. However, in the second embodiment, the tape TP1 is used as in the first embodiment, and thus there is no concern that the foreign matter RZb is generated.

As described above, in the second embodiment, the increase in the manufacturing process can be suppressed and the performance of the display device DSP2 can be improved as compared with the studied example.

A person having ordinary skill in the art can make various modifications and corrections within a scope of the idea of the present invention, and it is interpreted that the modifications and the corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

INDUSTRIAL APPLICABILITY

The present invention can be applied to a display device and an electronic equipment in which the display device is incorporated.

What is claimed is:
1. A display device comprising:
a backlight unit having an opening;
a bezel having a bottom portion covering a lower side of the backlight unit and a side portion covering the opening in an inside of the opening;
a panel having a display region, a first region overlapping with the opening inside the display region, and a second region provided between the display region and the first region; and
a first polarizing plate and a first resin film having a light-blocking property provided between the panel and the backlight unit,
wherein the panel, the backlight unit, and the bezel are adhered by a first tape having a light-blocking property at a position overlapping with the second region,
wherein the first tape is adhered to the side portion of the bezel, wherein the first resin film is located closer to the first region than the first polarizing plate, wherein the first tape is located at a position overlapping with the second region and is provided between the first polarizing plate and the backlight unit and between the first resin film and the bezel, wherein the first tape includes a second tape and a third tape, wherein the second tape has a function of blocking visible light, is a double-sided tape, and is provided between the first polarizing plate and the backlight unit and between the first resin film and the bezel, wherein one side of the third tape is adhered to the second tape on the side portion of the bezel, and wherein the other side of the third tape that is not adhered to the second tape has an adhesive force smaller than those of both sides of the second tape.

2. The display device according to claim 1,
wherein a thickness of the second tape is larger than that of the third tape.

3. The display device according to claim 1,
wherein the panel is provided with a plurality of the first regions,
wherein the second region is also provided between the first regions adjacent to each other, and
wherein the panel, the backlight unit, and the bezel are adhered to each other by the first tape also in the second region between the first regions adjacent to each other.

4. The display device according to claim 1,
wherein the panel includes a first substrate, a second substrate, and a liquid crystal layer provided between the first substrate and the second substrate,
wherein the first substrate has a plurality of transistors in the display region, and
wherein the second substrate has a plurality of color filters in the display region.

5. An electronic equipment using the display device according to claim 1,
wherein a camera module is mounted at a position overlapping with the first region.

6. The display device according to claim 1,
wherein the first tape has a plurality of slits at a position overlapping with the opening, and
wherein a part of the side portion of the bezel is exposed in the plurality of slits.

7. The display device according to claim 6,
wherein the first tape is adhered to the bottom portion of the bezel, the plurality of slits extend to the bottom portion, and a part of the bottom portion is exposed in the plurality of slits.

8. A method of manufacturing a display device comprising:
(a) a step of preparing a first tape in which a second tape which is a double-sided tape and a third tape are bonded together;
(b) a step of processing an outer diameter of the third tape so that a part of the second tape is exposed;
(c) a step of processing an outer diameter of the second tape and forming a slit penetrating through the second tape and the third tape;
(d) a step of preparing a panel including a first substrate, a second substrate provided above the first substrate, and an electro-optical layer formed between the first substrate and the second substrate;
(e) a step of preparing a backlight unit;
(f) a step of preparing a bezel having a bottom portion and a side portion bent from the bottom portion;
(g) after the steps (a) to (f), a step of mounting the backlight unit on the bottom portion of the bezel such that a side of the backlight unit is covered with the side portion of the bezel;
(h) after the step (g), a step of attaching a portion of the second tape exposed from the third tape to a tip of the side portion of the bezel and an upper surface of the backlight unit;
(i) after the step (h), a step of attaching a portion of the second tape covered with the third tape to the side portion of the bezel; and
(j) after the step (i), a step of attaching the portion of the second tape exposed from the third tape to the panel,
wherein the panel has a transparent region provided inside a display region of the panel in a plan view and a frame region provided between the transparent region and the display region in a plan view,
wherein the backlight unit and the bezel are provided below the first substrate so as not to overlap with the transparent region in a plan view,
wherein the second tape and the third tape are provided in the frame region, and
wherein the second tape and the bezel have a function of blocking visible light.

9. The method of manufacturing the display device according to claim 8,
wherein the panel further includes a first polarizing plate and a first resin film provided below the first substrate,
wherein the first resin film is located closer to the transparent region than the first polarizing plate is and has a function of blocking visible light, and
wherein, in the step (j), the second tape is bonded to the first polarizing plate and the first resin film.

10. A method of manufacturing an electronic equipment using the method of manufacturing the display device according to claim 8, further comprising:
(k) after the step (j), a step of mounting a camera module in the transparent region.

11. A backlight unit comprising:
a light guide layer having an opening;
a bezel having a bottom portion and a side portion covering the opening in an inside of the opening; and
a first tape adhered to the bottom portion and the side portion,
wherein the first tape has a plurality of slits,
wherein the side portion of the bezel is exposed in the plurality of slits at a position where the plurality of slits are provided, and
wherein the plurality of slits extend to the bottom portion, and a part of the bottom portion is exposed in the plurality of slits.

12. The backlight unit according to claim 11,
wherein the first tape is adhered to the bezel from a tip of the side portion to the bottom portion.

13. The backlight unit according to claim 12,
wherein the first tape includes a double-sided tape and a film,
wherein the double-sided tape has a function of blocking visible light and is adhered to the bezel, and
wherein the film is adhered to the double-sided tape on the side portion of the bezel.

* * * * *